United States Patent [19]

Glaeser

[11] 4,125,586

[45] Nov. 14, 1978

[54] REMOVAL OF ALCL$_3$ FROM CRUDE TICL$_4$ BY ADDITION OF H$_2$O AND NACL

[75] Inventor: Hans H. Glaeser, Wilmington, Del.

[73] Assignee: E. I. Du Pont de Nemours and Company, Wilmington, Del.

[21] Appl. No.: 871,117

[22] Filed: Jan. 20, 1978

[51] Int. Cl.$^2$ ............................................. C01G 23/02
[52] U.S. Cl. .................................... 423/84; 423/122; 423/124; 423/492
[58] Field of Search ................ 423/84, 116, 122, 124, 423/126, 463, 472, 492; 203/29

[56] References Cited

U.S. PATENT DOCUMENTS

| | | | |
|---|---|---|---|
| 2,598,898 | 6/1952 | Espenschied | 203/29 |
| 2,600,881 | 6/1952 | Kay | 203/29 |
| 3,066,010 | 11/1962 | Horning et al. | 423/492 |
| 4,070,252 | 1/1978 | Bonsack | 203/29 |

*Primary Examiner*—Brian Hearn

[57] ABSTRACT

A process for the removal of aluminum chloride from a liquid solution thereof with the liquid metal chlorides resulting from the chlorination of titaniferous materials by mixing water and sodium chloride with the liquid solution in amounts such that the amount of water is less than equimolar with respect to the total amount of aluminum chloride and the combined amount of water and sodium chloride is at least equimolar with respect to the total amount of aluminum chloride. This process significantly decreases the corrosion of apparatus associated with the presence of aluminum chloride and substantially eliminates losses of titanium tetrachloride and ferric chloride present in the liquid solution and reduces the formation of HCl.

4 Claims, No Drawings

REMOVAL OF ALCL₃ FROM CRUDE TICL₄ BY ADDITION OF H₂O AND NACL

BACKGROUND OF THE INVENTION

This invention relates to a process for the removal of aluminum chloride from a liquid solution thereof with the liquid metal chlorides resulting from the chlorination of titaniferous materials, and more particularly to an improved process of the removal of aluminum chloride which substantially eliminates loss of titanium tetrachloride, does not cause a substantial loss of ferric chloride from the liquid solution, and reduces the formation of HCl.

Titanium tetrachloride is produced commercially by chlorinating, under reducing conditions, titaniferous materials such as rutile or ilmenite, or other titanium-rich materials such as those obtained by beneficiating such ores. These raw materials, in addition to their titanium values, contain varying amounts of compounds of other metals, particularly iron and aluminum. Following the chlorination conversion of the titanium and other metals to their vaporous chlorides, the chlorides are recovered and condensed to the solid or liquid state depending upon the physical properties of the components and the recovery apparatus used. Usually a liquid sludge is obtained which is undesirably contaminated with dissolved impurities and undissolved solid material. The amount and type of chlorides present in the crude depends upon the exact composition of the titaniferous raw material chlorinated and the particular chlorination method utilized. However, the presence of aluminum chloride is to be expected in practically all cases where aluminum compounds are present in the raw materials or in the materials of construction of the apparatus, e.g., furnace bricks.

The art has recognized for some time that aluminum chloride is a highly corrosive component of the liquid metal chloride mixture. The aluminum chloride quickly and severely attacks metallic materials of construction in the processing apparatus and must either be quickly removed from the liquid or the apparatus must be specially lined with ceramic to prevent corrosion. An early attempt to overcome this problem is described in U.S. Pat. No. 2,600,881. This method is based on the discovery that water will form an insoluble noncorrosive compound of aluminum and thereby remove aluminum chloride from the other metal chlorides resulting from the chlorination reaction. It was recognized at the time of this teaching that the use of water in excess of a stoichiometric amount was undesirable because the water would react with the desired titanium tetrachloride to form titanium oxychlorides and cause loss of the titanium value of the titaniferous material. However, it has been found that in order to practice this method on a commercial scale at least 10% stoichiometric excess of water is necessary to insure complete aluminum chloride removal, because it is practically impossible to determine at a given point and time in the chlorination process what proportion of the metal chlorides exiting the reactor is in fact aluminum chloride, so slight excess of water is necessary to insure complete removal. This excess necessarily results in a corresponding loss in titanium values.

Another process which can be utilized to remove aluminum chloride from mixtures thereof with metal chlorides such as titanium tetrachloride is described in U.S. Pat. No. 3,066,010. This process involves contacting a gaseous mixture of metal chlorides containing aluminum chloride with a column of solid sodium chloride whereby the sodium chloride forms a solid complex with aluminum chloride and with any ferric chloride which may be present in the gaseous mixture. Although this process may be useful where it is desired to recover only the titanium tetrachloride from the gaseous mixture, in cases where ferric chloride is present in more than trace amounts, its removal will cause increased NaCl consumption and waste disposal problems and, furthermore, in many cases it is desired to retain ferric chloride for its economic value in areas such as water purification.

This invention provides for a process whereby the corrosive and undesirable aluminum chloride component of the mixture of liquid chlorides resulting from the chlorination of titaniferous materials can be completely removed and at the same time losses of titanium values are essentially eliminated, the potential valuable ferric chloride component of the mixture is retained, and HCl formation is reduced.

SUMMARY OF THE INVENTION

This invention provides for an improvement in the process for removing aluminum chloride from a liquid solution thereof with the liquid metal chlorides resulting from the chlorination of titaniferous materials by mixing water with the liquid solution to form an insoluble compound of aluminum, and separating the compound therefrom. The improvement for insuring the complete separation of aluminum chloride from the liquid solution essentially without loss of the titanium tetrachloride component thereof comprises mixing water and sodium chloride with the liquid solution wherein the amount of water is less than equimolar with respect to the total amount of aluminum in the ore and wherein the combined amount of water and sodium chloride is at least equimolar with respect to the total amount of aluminum in the ore.

It is preferred that the amount of water be at least 0.5 equimolar, but less than 1.0 equimolar, the balance to equimolarity being sodium chloride, with respect to the amount of aluminum in the ore. Furthermore, it is preferred that sodium chloride be present in an amount of at least 0.1 equimolar in excess of the combined equimolarity of sodium chloride and water with respect to the amount of aluminum in the ore. It is particularly preferred that sodium chloride be at least 0.2 equimolar in excess of the combined equimolarity of water and sodium chloride to insure complete removal of aluminum chloride. Although, in principle, there need not be an upper limit on the amount of sodium chloride utilized, it is recommended that no more than 0.5 equimolar with respect to the total amount of aluminum in the ore be utilized in excess of the equimolar amount of the combined water and sodium chloride. Use of greater amounts would not affect any further removal of aluminum chloride and would increase waste disposal problems.

In the case where the amount of AlCl₃ in the effluent varies by more than 20% by weight, it is recommended that less water and more NaCl be utilized, for example 0.7 equimolar water and 0.6 equimolar NaCl or 0.6 equimolar water and 0.8 equimolar NaCl.

The sodium chloride and water can be added to the liquid mixture of metal chlorides either together or separately. To insure complete reaction of the sodium chloride with the aluminum chloride component of the liquid mixture, it is recommended that the sodium chloride be mixed with the mixture of liquid metal chlorides under conditions of at least moderate agitation. It is further preferred to insure complete reaction that the sodium chloride have an average particle size from $30\mu$ to $400\mu$.

DETAILED DESCRIPTION OF THE INVENTION

This invention can be practiced on the mixture of metal chlorides resulting from the chlorination of any titaniferous material, including beneficiated ores containing 90% or more of titanium dioxide; but the maximum advantages of the invention are realized in the lower grade ores such as ilmenite, containing 10% or more of iron, calculated as iron oxide.

The method by which the titaniferous material is chlorinated to form a mixture of metal chlorides is not critical to the practice of this invention. However, the resulting metal chloride mixture must be in the substantially liquid state for the efficacious practice of this invention, particularly where ferric chloride is a component of the mixture. It has been found that in the gaseous state, ferric chloride reacts with sodium chloride at about the same rate that aluminum chloride does and both these components would be removed. However, in the liquid state it has been found that ferric chloride is not as soluble in liquid titanium tetrachloride as aluminum chloride is and consequently in the liquid state the sodium chloride will preferentially react with the aluminum chloride under conditions of moderate agitation, leaving the ferric chloride mixed with the titanium tetrachloride for removal therefrom at a later point in the processing.

The method of incorporating the required amount of water into the mixture of metal chlorides is relatively unimportant, so long as an intimate mixture is obtained. The water may be added as a liquid or stream to the liquid mixture by merely dropping or otherwise feeding it onto the surface of the latter, or, if preferred, can be injected into the liquid, or otherwise comingled therewith by any known or desired means. Similarly, intimate admixture can be affected through resort to any common means, such as mechanical agitation with a paddle, circulation pump, or similar means. The time required to effect adequate mixing and treatment appears to depend upon the efficiency of the mixing operation rather than upon the speed of the chemical reaction, which has been discovered to be extremely rapid. The sodium chloride additive can be similarly mixed with the liquid mixture of metal chlorides, but unlike the water component must be mixed under conditions of at least moderate agitation to insure intimate contact with the metal chlorides. The sodium chloride can be added alone as a solid or in solution with the water component.

The temperature of the mixture of metal chlorides with which the water and sodium chloride are intimately mixed must be low enough to insure that the mixture is in substantially liquid form, i.e., less than about 136° C. at ambient pressure or adjusted accordingly at elevated temperatures.

The amounts of water and sodium chloride utilized in accordance with the guidelines set forth above are calculated on the basis of the total amount of aluminum chloride present in the mixture of metal chlorides. This amount of aluminum chloride is calculated on the basis of the total amount of aluminum present in the titaniferous material which is to be chlorinated. Although it has been earlier pointed out that at any given point in the process the amount of aluminum chloride exiting the reactor can vary somewhat, utilizing the water and sodium chloride in accordance with this invention on the basis of the total amount present avoids the need to know the exact amount of aluminum chloride present at any point, because the amount of water utilized is less than stoichiometric and therefore will not result in loss of titanium values. The sodium chloride utilized will selectively react with the aluminum chloride leaving the titanium tetrachloride to be recovered later.

The following examples are intended to illustrate the invention.

EXAMPLE 1 AND CONTROLS

To determine the corrosion rate of a sample of steel metal in a simulated liquid $TiCl_4$ effluent, a corrosive liquid having the composition detailed in the Table was prepared in the following manner: two hundred milliliters of commercially available $TiCl_4$ were redistilled to insure the removal of any traces of $TiOCl_2$. The redistilled $TiCl_4$ was placed into an externally-heated distillation vessel provided with conventional agitating, i.e., a propeller, and associated condensing means. The liquid was stirred with the propeller at a rate of 450 r.p.m. and purged with nitrogen throughout the test. Liquid $H_2O$ was added using a syringe. Dried NaCl having a mesh size $-200 +325$ (U.S. Standard Sieve) was then added. After heating the resulting mixture to the boiling point of about 136° C., 9.0 g of commercially available anhydrous $AlCl_3$ was added. Two identical 1020 steel coupons were then immediately added. The steel coupons as well as all surfaces which were contacted by the liquid $TiCl_4$ were carefully dried by heating in a nitrogen atmosphere before use.

After one hour of immersion in the liquid mixture the steel coupons were removed from the liquid mixture, washed with water and acetone, dried in a desiccator and weighed. The rate of corrosion in mils/month was calculated by the equation:

$$\text{Corrosion Rate (mils/month)} = 283 \times \frac{\text{coupon weight loss in mgs/hour}}{\text{coupon area (cm}^2\text{)} \times \text{specific gravity of coupon}}$$

As shown in the Table, Example 1 showed only negligible corrosion. Control 1-A having no anticorrosion additives exhibited very high corrosion. Control 1-B using only NaCl decreased corrosion somewhat, but the rate of corrosion was still unacceptably high. Water alone, Control 1-C decreased corrosion further, but cannot be used in sufficiently high amounts without incurring loss of $TiCl_4$.

EXAMPLES 2, 2R AND CONTROLS

The procedure of Example 1 was followed except that 32.4 g of sublimed anhydrous $FeCl_3$ was added to the liquid mixture before heating to boiling. To prevent reaction between $FeCl_3$ and NaCl during the heating, NaCl was added immediately before adding $AlCl_3$ and the steel coupons. The composition of the test liquid mixtures and the rates of corrosion are shown in the Table.

EXAMPLE 3

The procedure of Example 1 was followed except that 18.0 g of $AlCl_3$ were added to the reaction vessel followed by heating to 100° C. and addition of 3.94 g of NaCl, then 17.0 g of $H_2O$. The amount of NaCl was 0.5 equimolar with respect to $AlCl_3$ and the amount of $H_2O$ was 0.7 equimolar with respect to $AlCl_3$. The resulting mixture was heated to boiling, i.e., 136° C., and refluxed for one hour. The $TiCl_4$ component of the mixture was then removed by distillation leaving 14.7 g of solid residue.

The solid residue was analyzed and found to contain only a minor amount of titanium specifically 0.44% by weight and essentially all the aluminum which was initially added to the mixture. This analysis demonstrates that substantially all the $TiCl_4$ in the original mixture was recovered.

TABLE

| Example No. | Composition of Liquid | | | | | Corrosion Rate (mils/month) of Two Steel Coupons |
|---|---|---|---|---|---|---|
| | $TiCl_4$(ml) | $AlCl_3$(g) | $FeCl_3$(g) | $H_2O$(g) | NaCl(g) | |
| 1 | 200 | 9.0 | 0 | 0.85* | 1.97** | 0 and 0.2 |
| Control 1-A | 200 | 9.0 | 0 | 0 | 0 | 8.1 and 10.0 |
| Control 1-B | 200 | 9.0 | 0 | 0 | 4.73+ | 3.8 and 5.1 |
| Control 1-C | 200 | 9.0 | 0 | 0.85* | 0 | 1.4 and 1.9 |
| 2 | 200 | 9.0 | 32.4 | 0.85* | 1.97** | 0 and 0 |
| 2R | 200 | 9.0 | 32.4 | 0.85* | 1.97** | 0 and 0.2 |
| Control 2-A | 200 | 9.0 | 32.4 | 0 | 0 | 36.6 and 59.1 |
| Control 2-B | 200 | 9.0 | 32.4 | 0 | 4.73+ | 4.6 and 5.4 |
| Control 2-C | 200 | 9.0 | 32.4 | 0.85* | 0 | 1.6 and 1.7 |

*Equivalent to 0.7 equimolar with respect to $AlCl_3$
**Equivalent to 0.5 equimolar with respect to $AlCl_3$
+Equivalent to 1.2 equimolar with respect to $AlCl_3$

What is claimed is:

1. In a process for the removal of aluminum chloride from a liquid solution thereof with a liquid mixture of metal chlorides resulting from the chlorination of titaniferous materials comprising mixing water with the liquid mixture to form an insoluble compound with aluminum and separating the compound therefrom, the improvement for insuring the complete separation of aluminum chloride essentially without loss of the titanium tetrachloride component of the liquid mixture comprising mixing water and sodium chloride with the liquid mixture wherein the amount of water is less than equimolar with respect to the total amount of aluminum in the ore and wherein the combined amount of water and sodium chloride is at least equimolar with respect to the total amount of aluminum in the ore.

2. Process of claim 1 wherein the amount of sodium chloride is at least 0.1 equimolar in excess of the combined equimolar amount of water and sodium chloride with respect to the total amount of aluminum in the ore.

3. Process of claim 1 wherein the sodium chloride has an average particle size from $30\mu$ to $400\mu$.

4. Process of claim 1 wherein the sodium chloride is mixed with the liquid mixture with at least moderate agitation.

* * * * *